E. J. WILSON.
CUSPIDOR.
APPLICATION FILED MAY 27, 1918.
1,305,428.
Patented June 3, 1919.
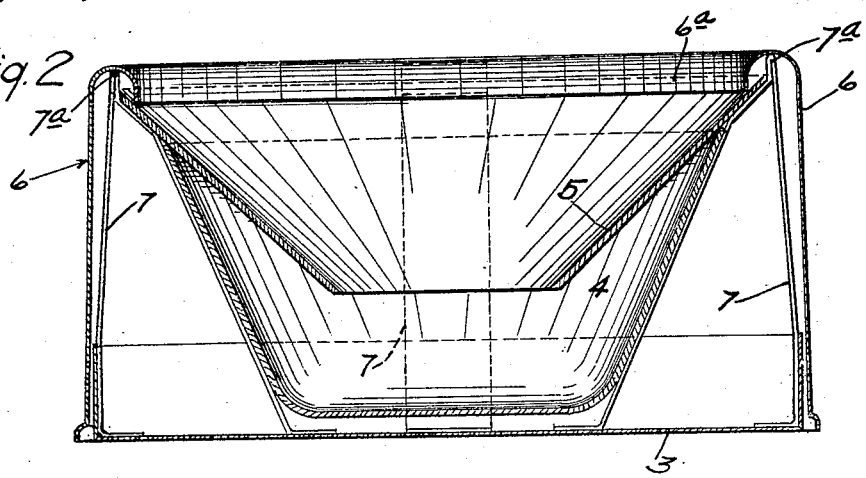
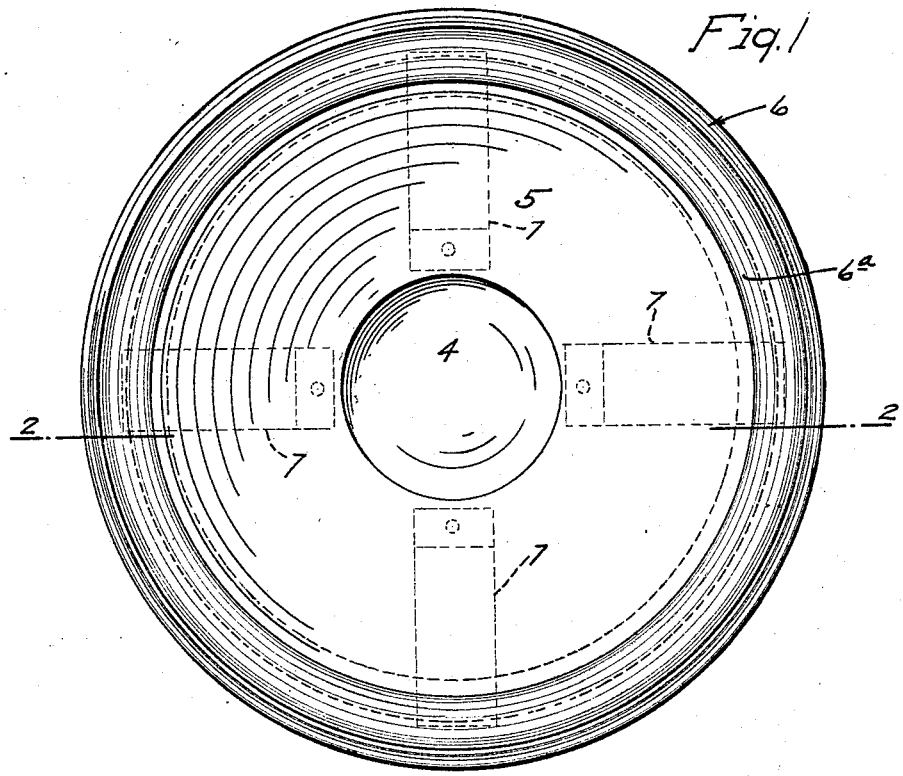
WITNESSES
E. C. Wells
A. H. Opsahl
INVENTOR
Ervon J. Wilson
BY HIS ATTORNEYS
Williamson & Merchant

UNITED STATES PATENT OFFICE.

ERVON J. WILSON, OF MINNEAPOLIS, MINNESOTA, ASSIGNOR OF ONE-HALF TO ANTON O. OUREN, OF MINNEAPOLIS, MINNESOTA.

CUSPIDOR.

1,305,428.  Specification of Letters Patent.  Patented June 3, 1919.

Application filed May 27, 1918. Serial No. 236,876.

*To all whom it may concern:*

Be it known that I, ERVON J. WILSON, a citizen of the United States, residing at Minneapolis, in the county of Hennepin and State of Minnesota, have invented certain new and useful Improvements in Cuspidors; and I do hereby declare the following to be a full, clear, and exact description of the invention, such as will enable others skilled in the art to which it appertains to make and use the same.

My invention has for its object to provide an extremely simple and highly efficient sanitary cuspidor; and to such ends, generally stated, the invention consists of the novel devices and combinations of devices hereinafter described and defined in the claims.

The invention is illustrated in the accompanying drawings wherein like characters indicate like parts throughout the several views.

Referring to the drawings,

Figure 1 is a plan view of the improved cuspidor; and

Fig. 2 is a vertical section taken approximately on the line 2—2 of Fig. 1.

The improved cuspidor comprises, as its main elements, a base 3, a bowl 4, a funnel 5, and a clamping rim 6. The base 3, preferably has a marginal flange which is not, however, very high. Rigidly secured upon and sliding from the base 3, are so-called centering rings 7 which must be three or more in number and, of which as shown, there are four. These brackets 7 are preferably made from thin flat sheet metal strips having their ends rigidly secured to said base by rivets, solder, or otherwise. The inner legs of the brackets 7 are inclined so that they fit the exterior of the bowl 4, and the upper portions of said inner legs are bent so that they engage the outer portion of the funnel and support the same. At the extreme upper portions, the brackets 7 are projected upward at 7ª to afford finger-like stop projections that positively hold the funnel 5 centered. These several brackets 7, therefore accurately center the bowl and the funnel in respect to each other, and in respect to the base, but leave the said funnel and bowl free for separation and removal.

The clamping rim 6 is preferably of cylindrical form and of such height that it will extend from the top to the bottom of the cuspidor, telescope freely around the base, and centering brackets. The upper edge portions of this clamping 6 is turned inwardly and downwardly to afford a funnel engaging flange 6ª that rests upon and engages the outer portion of the funnel and completely covers over the rim of the funnel. The clamping rim is loosely placed in position and gravity held but capable of easy separation. The several parts of the cuspidor may, therefore, be very quickly and easily assembled or taken apart. The base 3, clamping rim 6 and centering brackets 7 are preferably of metal, while the bowl 4 and funnel 5 are preferably of heavy paper or cardboard. Nevertheless, all of the said parts may be made of metal in as much as they may be easily separated and cleaned and re-assembled. When the bowl and funnel are of paper, or other cheap non-metallic substance, they may be thrown away and replaced at small cost. The cuspidor is, therefore, not only easily cleaned, but sanitary. The bowl and funnel, when made of paper, or the like, may be treated with anticeptics or a germ destroying substance.

What I claim is:

1. A cuspidor comprising a bowl having circumferentially spaced centering brackets, a bowl detachably seated on and centered by said brackets, a funnel detachably seated on said brackets and centered above said bowl, and a clamping rim having an inturned flange seated on the outer portion of said funnel, the said clamping rim being telescoped around said centering brackets and base and extended from top to bottom of the cuspidor, thereby entirely inclosing the sides thereof.

2. A cuspidor comprising a base, a flaring bowl, a funnel of larger diameter than said bowl and a clamping rim, said base having a plurality of circumferentially spaced centering brackets formed with inclined surfaces engaging said bowl and funnel and centering the same with the said funnel above said bowl, and said clamping rim having an inturned flange overlying the rim of said funnel, the said brackets having upwardly projected stop flanges projecting above the rim of said funnel and into the channels formed by the inturned flange of said clamping rim.

In testimony whereof I affix my signature in presence of two witnesses.

ERVON J. WILSON.

Witnesses:
 D. H. COOK,
 F. D. MERCHANT.

Copies of this patent may be obtained for five cents each, by addressing the "Commissioner of Patents, Washington, D. C."